United States Patent
Hsieh et al.

(10) Patent No.: US 11,592,172 B2
(45) Date of Patent: Feb. 28, 2023

(54) DISPLAY SYSTEM AND CONTROL METHOD

(71) Applicant: QISDA CORPORATION, Taoyuan (TW)

(72) Inventors: Hsin-Che Hsieh, Taoyuan (TW); Wei-Jou Chen, Hsinchu County (TW); Yu-Fu Fan, Taoyuan (TW); Po-Fu Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 53 days.

(21) Appl. No.: 17/352,376

(22) Filed: Jun. 21, 2021

(65) Prior Publication Data

US 2022/0003405 A1  Jan. 6, 2022

(30) Foreign Application Priority Data

Jul. 2, 2020 (CN) .......................... 202010632421.1

(51) Int. Cl.
| | |
|---|---|
| *F21V 33/00* | (2006.01) |
| *F21V 21/28* | (2006.01) |
| *G06F 1/16* | (2006.01) |
| *H05B 47/105* | (2020.01) |
| *H05B 45/20* | (2020.01) |

(Continued)

(52) U.S. Cl.
CPC .......... *F21V 33/0052* (2013.01); *F21V 21/28* (2013.01); *F21V 23/0492* (2013.01); *G06F 1/1605* (2013.01); *G06F 1/1607* (2013.01); *H05B 45/20* (2020.01); *H05B 47/10* (2020.01); *H05B 47/105* (2020.01); *H05B 47/165* (2020.01)

(58) Field of Classification Search
CPC .......................... G06F 1/1607; F21V 33/0052
See application file for complete search history.

(56) References Cited

U.S. PATENT DOCUMENTS

| | | | | |
|---|---|---|---|---|
| 5,379,201 A | * | 1/1995 | Friedman | ............ F21V 33/0052 362/253 |
| 6,474,823 B1 | * | 11/2002 | Agata | ................... G06F 1/1607 362/85 |

(Continued)

FOREIGN PATENT DOCUMENTS

| | | |
|---|---|---|
| CN | 202563205 U | 11/2012 |
| CN | 107504450 A | 12/2017 |

(Continued)

*Primary Examiner* — William N Harris (57) ABSTRACT

A display system and a control method are provided. The display system includes a display device, an illumination device and a control circuit. The display device includes a display panel. The display panel is configured to display an image frame. The illumination device is movably disposed on the display device. The illumination device selectively projects light in a first direction or in a second direction different from the first direction. When the illumination device projects the light in the first direction, the control circuit generates a first control signal so as to control the illumination device to perform a first illumination mode. When the illumination device projects the light in the second direction, the control circuit generates a second control signal so as to control the illumination device to perform a second illumination mode different from the first illumination mode.

20 Claims, 8 Drawing Sheets

(51) Int. Cl.
  *H05B 47/165* (2020.01)
  *H05B 47/10* (2020.01)
  *F21V 23/04* (2006.01)

(56) References Cited

U.S. PATENT DOCUMENTS

| | | | | |
|---|---|---|---|---|
| 2001/0026445 | A1* | 10/2001 | Naghi | F21V 23/04 362/85 |
| 2006/0256584 | A1* | 11/2006 | Paoluccio | F21S 2/005 362/652 |
| 2008/0031001 | A1* | 2/2008 | Sun | F21V 33/0052 362/427 |
| 2019/0346129 | A1* | 11/2019 | Yang | F21V 21/22 |
| 2019/0353343 | A1* | 11/2019 | Pan | F21V 21/26 |
| 2020/0116337 | A1* | 4/2020 | Yen | F21V 21/088 |

FOREIGN PATENT DOCUMENTS

| | | |
|---|---|---|
| CN | 110390879 A | 10/2019 |
| KR | 10-2008-0032509 | 4/2008 |

\* cited by examiner

DISPLAY SYSTEM AND CONTROL METHOD

BACKGROUND OF THE INVENTION

1. Field of the Invention

The present invention relates to a display system and control method, and more particularly, to a display system and control method capable of enhancing visual immersion.

2. Description of the Prior Art

With development of display technology, display devices are widely applied in various electronic products, such as notebooks, desktop computers, mobile communication devices. People frequently use electronic products whether they are at home or at work, such that the time and frequency people spend on viewing a display device of the electronic product may be increasing. However, an insufficient lighting environment may cause eye strain or fatigue. Further, if the user can only watch contents displayed on the display device, the user may easily feel tedious or boring when watching the display device. Thus, the prior art has to be improved.

SUMMARY OF THE INVENTION

It is therefore a primary objective of the present invention to provide a display system and a control method capable of enhancing visual immersion, to solve the above-mentioned problem.

According to an embodiment of the present invention, an exemplary display system is disclosed. The exemplary display system comprises a display device comprising a display panel, wherein the display panel is configured to display an image frame; an illumination device movably disposed on the display device, wherein the illumination device selectively projects light in a first direction or in a second direction which is different from the first direction; and a control circuit, wherein when the illumination device projects the light in the first direction, the control circuit is configured to generate a first control signal so as to control the illumination device to perform a first illumination mode, wherein when the illumination device projects the light in the second direction, the control circuit is configured to generate a second control signal so as to control the illumination device to perform a second illumination mode which is different from the first illumination mode.

According to an embodiment of the present invention, an exemplary control method fora display device is disclosed. The display device comprises a display panel for display an image frame. The exemplary control method comprises disposing an illumination device on the display device; the illumination device selectively projecting light in a first direction or in a second direction which is different from the first direction; generating a first control signal to control the illumination device to perform a first illumination mode when the illumination device projects the light in the first direction; and generating a second control signal to control the illumination device to perform a second illumination mode when the illumination device projects the light in the second direction, wherein the second illumination mode is different from the first illumination mode.

According to an embodiment of the present invention, an exemplary display system is disclosed. The exemplary display system comprises a display device comprising a display surface and a back surface opposite to the display surface, wherein the display surface is utilized for displaying an image frame; an illumination device disposed on one side of the display device, wherein the illumination device is capable of moving relative to the one side of the display device; a position detector configured to detect that the illumination device is selectively at a first position or at a second position; and a control circuit, wherein when position detector detects that the illumination device is at the first position and projects the light in the first direction, the control circuit is configured to generate a first control signal to control the illumination device for performing a first illumination mode according to a detection signal generated by the position detector, and when position detector detects that the illumination device is at the second position and projects the light in the second direction, the control circuit is configured to generate a second control signal to control the illumination device for performing a second illumination mode according to the detection signal generated by the position detector.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
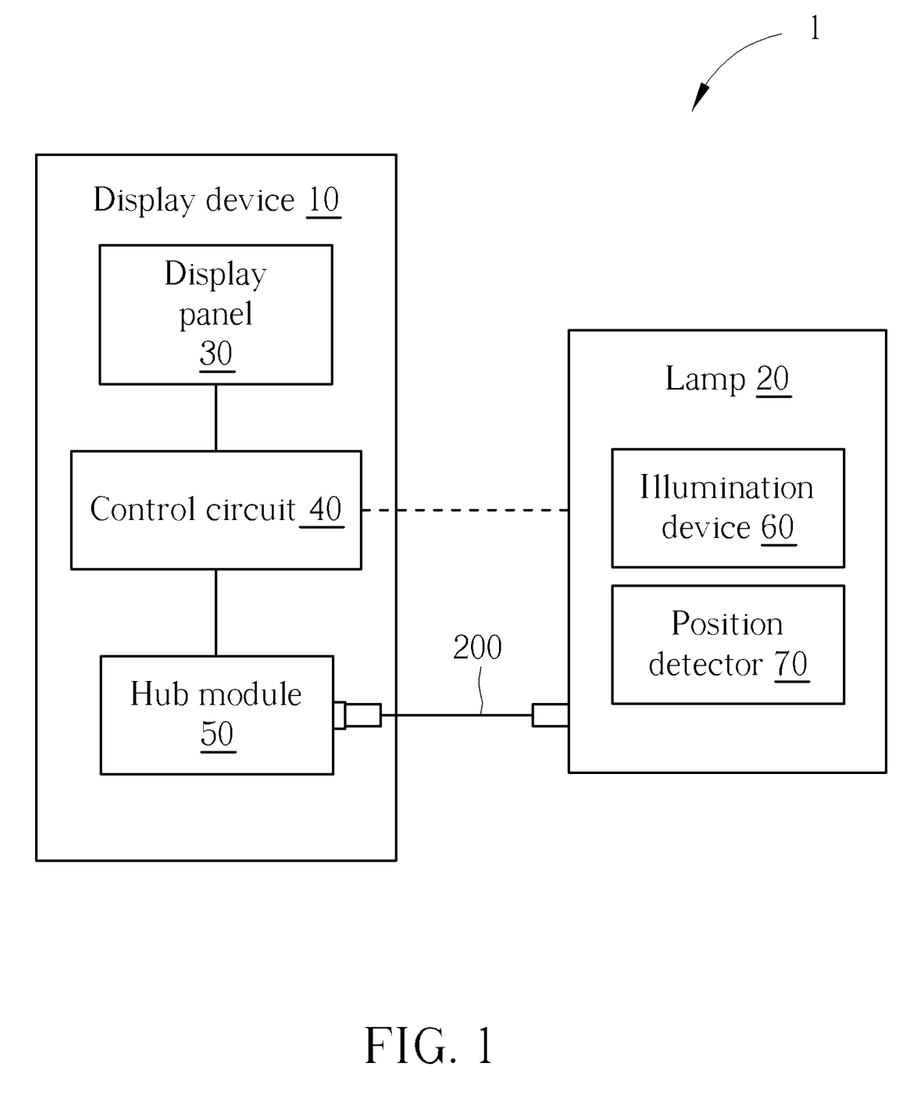
FIG. 1 is a schematic diagram of a display system according to an embodiment of the present invention.

Please refer to FIG. 1, which is a schematic diagram of a display system 1 according to an embodiment of the present invention. The display system 1 includes a display device 10 and a lamp 20. The display device 10 includes a display panel 30, a control circuit 40 and a hub module 50. The lamp 20 includes an illumination device 60 and a position detector 70. The lamp 20 may be integrated and disposed within the display device 10. The lamp 20 may be movably or detachably mounted on one side of the display device 10. The lamp 20 may be connected to the hub module 50 via a connection wire for communicating with the control circuit 40. The display panel 30 is configured to display image frames. The display panel 30 may be a liquid crystal display (LCD) panel or an organic light-emitting diode (OLED) display panel, but not limited thereto. The control circuit 40 is configured to control the illumination device 60. As the control circuit 40 is disposed within the display device 10, the control circuit 40 may also control the display panel 30 for displaying image frame. For example, the control circuit 40 may receive image frames from external device and provide the received image frames to the display panel 30 for display. The control circuit 40 may be scaler, a microprocessor, a central processing unit (CPU) or a graphics processing unit (GPU), but not limited thereto. In another embodiment, the control circuit 40 may be disposed within the detachable lamp 20 for controlling the illumination device 60.

Figure 2:
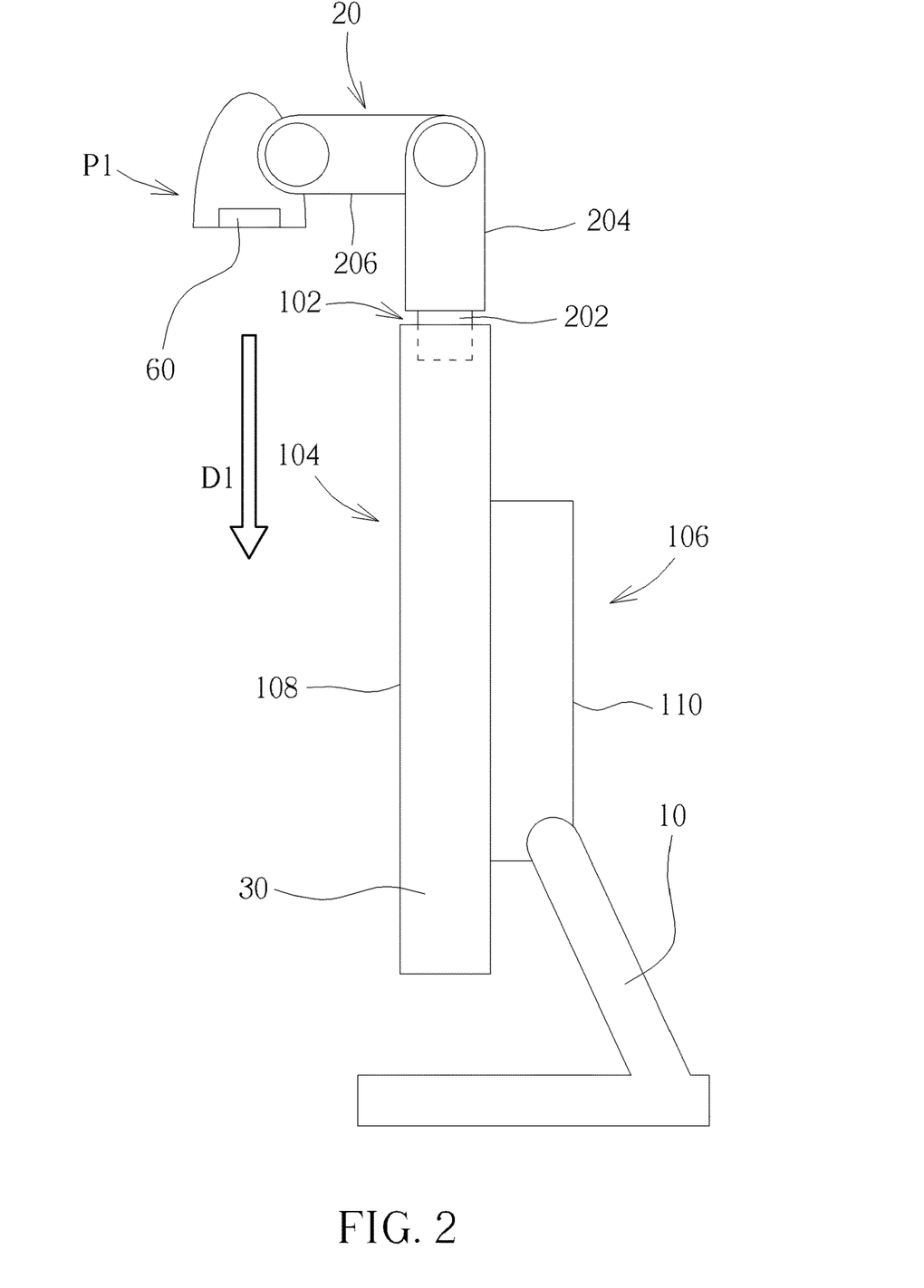
FIG. 2 to FIG. 4 are schematic diagrams illustrating across sectional view of an illumination device shown in FIG. 1 during located at various positions according to embodiments of the present invention.
Figure 3:
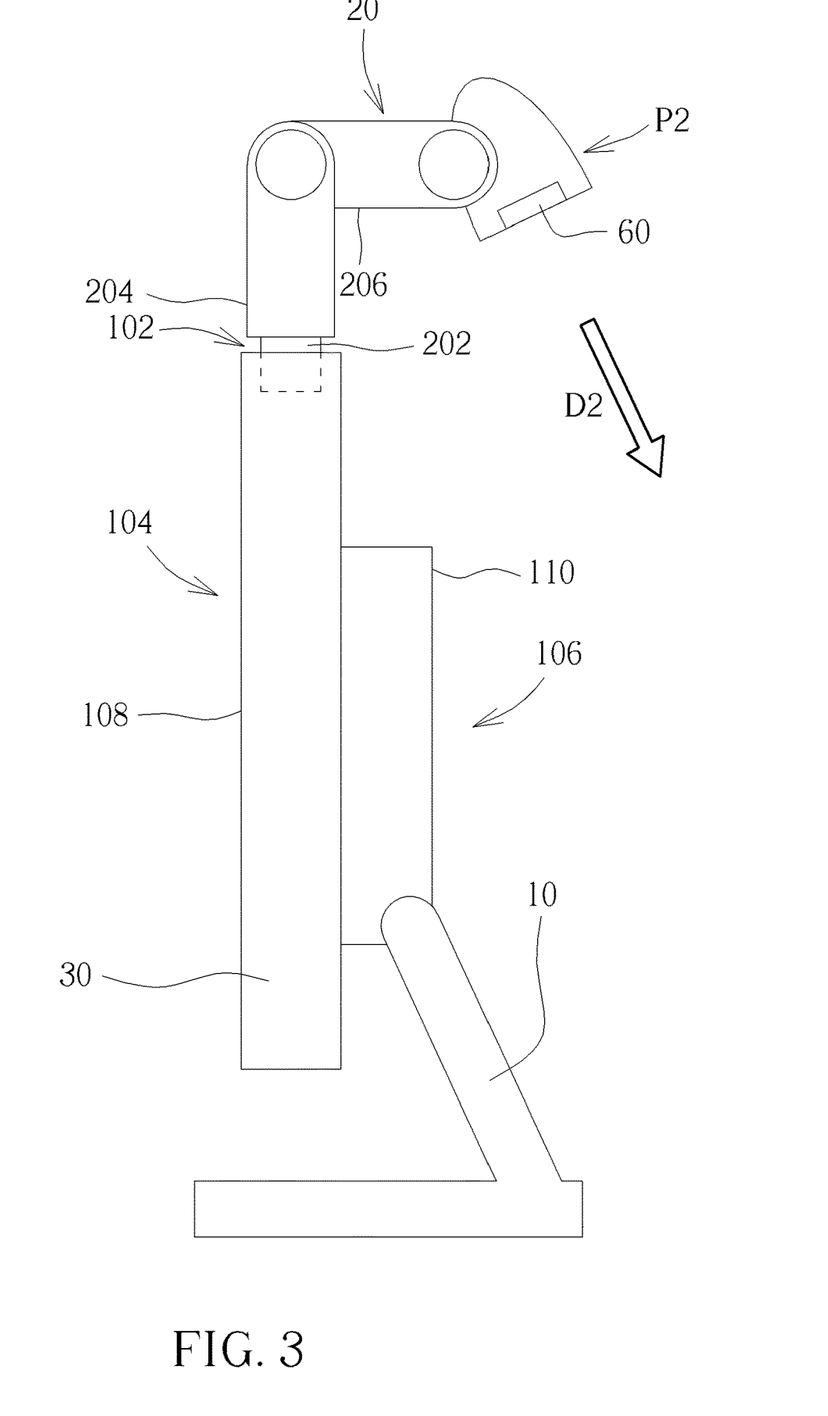

As shown in FIG. 2, the lamp 20 is a detachable lamp which is detachably disposed on the display device 10. The illumination device 60 may rotate or move with respect to the display device 10. The illumination device 60 includes at least one light source element for emitting light. The at least one light source element may be arranged in a matrix-like manner. The number and arrangement of light source elements may be designed according to system requirements. The at least one light source element may be realized with light emitting diodes (LEDs), organic light emitting diodes (OLEDs), micro light emitting diodes (μLEDs) or any other device capable of emitting light. The at least one light source element may selectively project light in various directions. For example, as shown in FIG. 2, the illumination device 60 is located at the position P1 and projects light in the direction D1. As shown in FIG. 3, the illumination device 60 is located at the position P2 and projects light in the direction D2. As shown in FIG. 3, the illumination device 60 is located at the position P3 and projects light in the direction D3.

The position detector 70 is configured to detect a position of the illumination device 60. Please further refer to FIG. 2. The lamp 20 further includes a fixing component 202. The fixing component 202 is utilized for fixing the lamp 20 on the display device 10. For example, as shown in FIG. 2, the fixing component 202 is utilized for fixing the lamp 20 onto an upper side 102 of the display device 10. As shown in FIG. 2, the fixing component 202 may be a universal serial bus (USB) cable, a USB plug or a USB connector for receiving parameters of image frames. The parameters of the image frames may be utilized for driving the illumination device 60. The control circuit 40 may selectively generate the corresponding control signal according to the parameters of the image frames. In an embodiment, the illumination device 60 and the position detector 70 may be disposed on the lamp 20. As such, when the lamp 20 rotates or moves relative to the display device 10, the illumination device 60 also rotates or moves relative to the display device 10. In addition, the fixing component 202 may be utilized to fix the lamp 20 to the display device 10 by using clamping, locking, screw locking, monolithically formed or any other fixing method. Under such a situation, the lamp 20 may further include a signal wire 200 coupled to the hub module 50. For example, the signal wire 200 may be a USB cable, a USB plug or a USB connector. The hub module 50 may be further connected to a host outside the display system 1. For example, the illumination mode may be decided by the host outside the display system 1 and thus a corresponding illumination mode command may be transmitted to the display system 1 through the hub module 50 by the host. The hub module 50 may be an internal USB hub of the display device 10.

In an embodiment, the control circuit 40 may generate control signals to control the illumination device 60, such that the illumination device 60 may perform various illumination modes accordingly. For example, the control circuit 40 may generate the control signal according to the current light projection direction of the illumination device 60, so as to control the illumination device 60 to perform various illumination modes. When the illumination device 60 projects light in the direction D1, the control circuit 40 generates a control signal SC1 to control the illumination device 60 to perform a first illumination mode. When the illumination device 60 projects light in the direction D2, the control circuit 40 generates a control signal SC2 to control the illumination device 60 to perform a second illumination mode. such like this, when the illumination device 60 projects light in the direction D3, the control circuit 40 generates a control signal SC3 to control the illumination device 60 to perform a third illumination mode.

In an embodiment, the control circuit 40 may generate control signals according to the current light projection direction of the illumination device 60 and the image frame displayed by the display panel 30, so as to control the illumination device 60 to perform various illumination modes accordingly. For example, please refer to FIG. 2 and FIG. 5. The control circuit 40 receives an image frame F from a host and transmits the image frame F to the display panel 30. The display panel 30 displays the image frame F. The display device 10 includes an upper side 102, a front side 104 and a back side 106. The back side 106 is opposite to the front side 104. The display device 10 further includes a display surface 108 (i.e. a display surface of the display panel 30) and a back surface 110 opposite to the display surface 108. As show in FIG. 2, the display panel 30 is disposed on the front side 104 of the display device 10. The illumination device 60 is disposed on the upper side 102 of the display device 10 and projects light in the direction D1. Under such a situation, the illumination device 60 may illuminate the front side 104 of the display device 10 (i.e. the front side of the display panel 30). The direction D1 is relative to the display surface 108. When the illumination device 60 projects light in the direction D1, the control circuit 40 generates a control signal SC1 according to display contents of a display area A1 of the image frame F and the illumination device 60 projects a first pattern F1 to the front side 104 of the display device 10 according to the control signal SC1 for performing a first illumination mode. For example, the control signal SC1 may be associated with the display contents of the display area A1 of the image frame F. For example, the control signal SC1 may be associated with color values of display pixels in the display area A1 of the image frame F. The control signal SC1 may be associated with brightness values of display pixels in the display area A1 of the image frame F. The first pattern F1 projected by the illumination device 60 in the first illumination mode may be associated with the display contents of the display area A1 of the image frame F. Color values of the first pattern F1 projected by the illumination device 60 in the first illumination mode may be associated with color values of display pixels in the display area A1 of the image frame F. Brightness values of the first pattern F1 projected by the illumination device 60 in the first illumination mode may be associated with brightness values of display pixels in the display area A1 of the image frame F.

Figure 5:
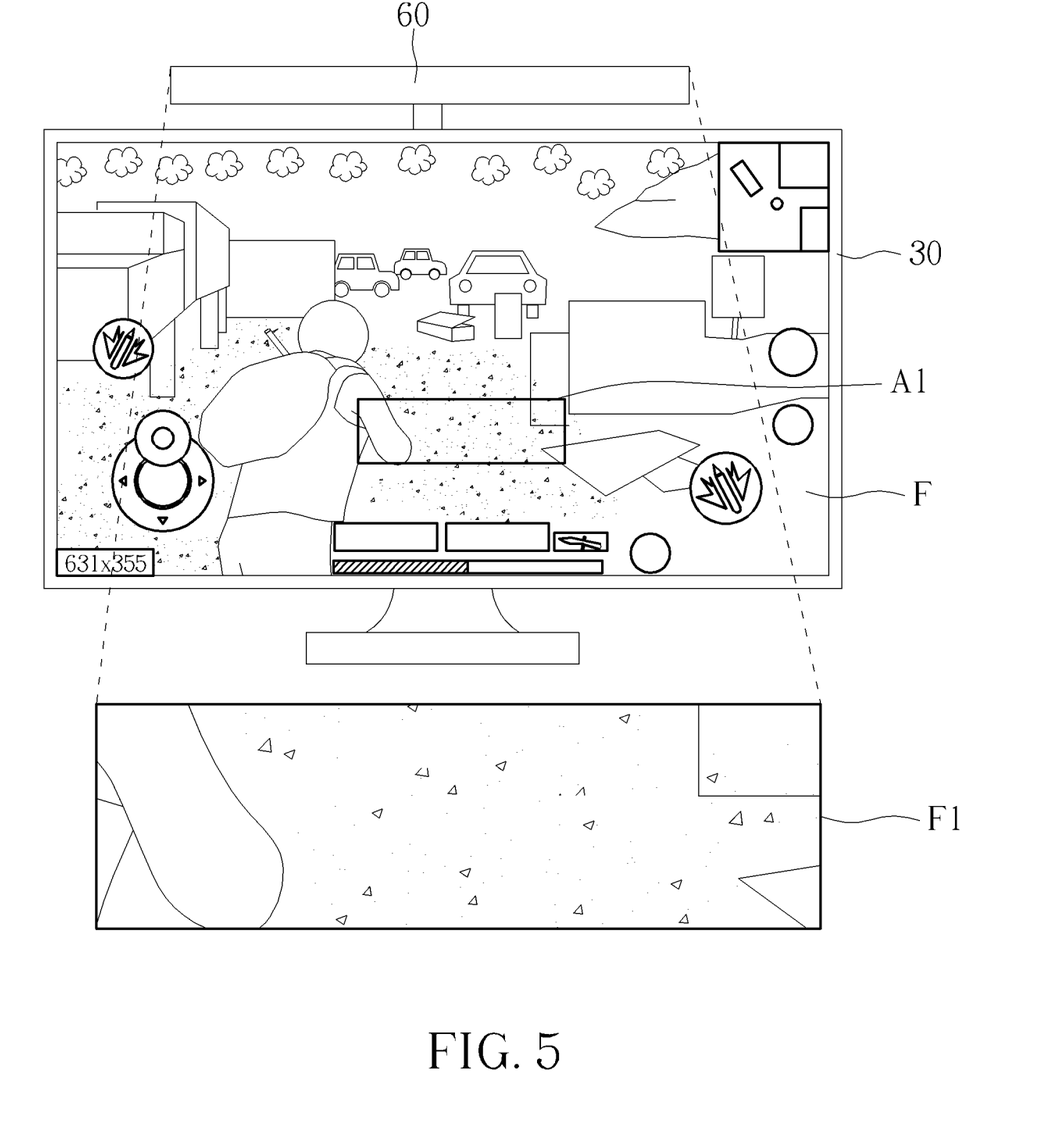
FIG. 5 to FIG. 7 are schematic diagrams illustrating the illumination device shown in FIG. 1 when projecting at various directions according to embodiments of the present invention.

For example, as the user is playing an online game and is utilizing the display system 1 to implement the online game. As shown in FIG. 5, the display panel 30 is displaying an image frame F. A game character equipped with a weapon is walking forward on the yellow and brown dirt ground. The current display content in the display area A1 of the image frame F includes the yellow and brown dirt ground. The illumination device 60 is projecting the light in the direction D1 (i.e. is projecting the light at the front side 104 of the display panel 30). The control circuit 40 generates the control signal SC1 according to the display contents of the display area A1 of the image frame F, such that the illumination device 60 projects a first pattern F1 to the front side 104 of the display device 10 according to the control signal SC1 for performing the first illumination mode. As shown in FIG. 5, the first pattern F1 may be (or be similar to) the yellow and brown dirt ground shown in the display area A1 of the image frame F. Under such a situation, the first pattern F1 may be an extension of the ground shown in the image frame F, and the first pattern F1 may be regarded as atmosphere light, ambient light or an immersive projected light pattern. Therefore, during playing the online game, the user can not only see the image frame F displayed on the display panel 30, but also see the first pattern F1 projected on the front side 104 of the display device 10 by the illumination device 60 in the first illumination mode. For example, the first pattern F1 may be projected on a table at the front side 104 of the display device 10. As a result, the embodiment of the present invention can provide better illumination and image effect for the user, and further bring a deeper visual immersion and give a more immersive experience to the user, and allow the user better immerse into the game situation.

Figure 6:
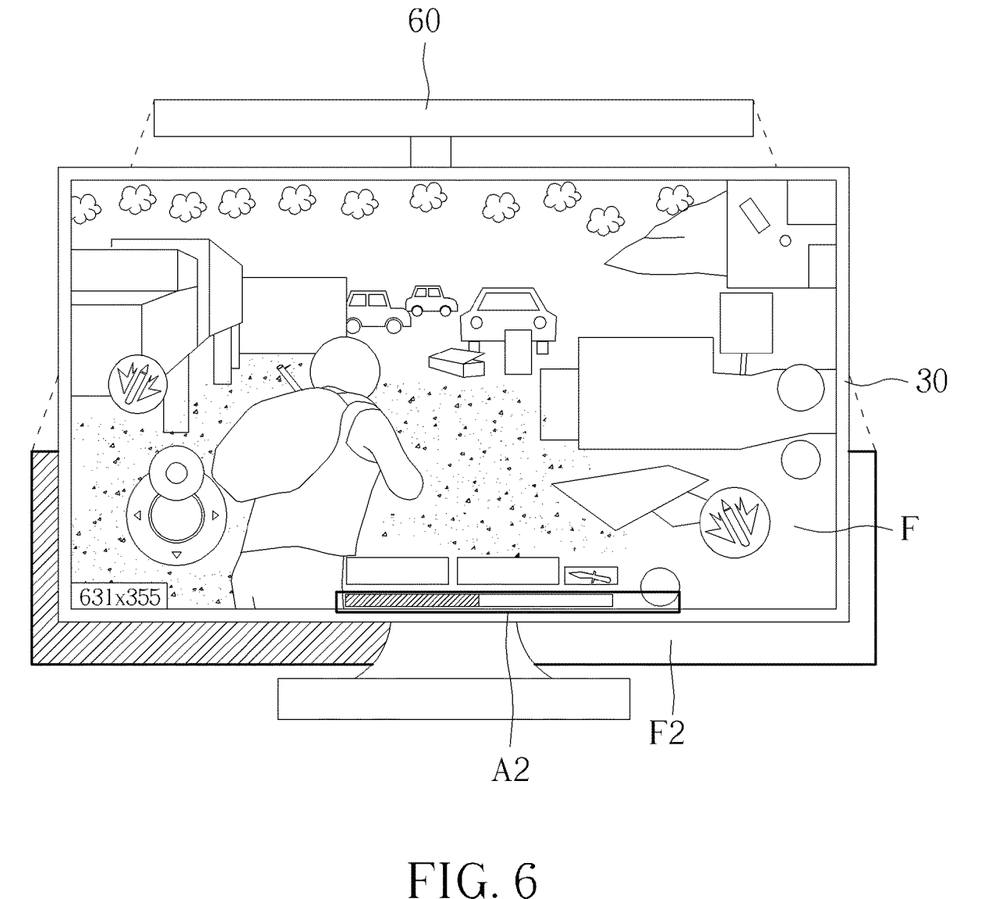

For example, please refer to FIG. 3 and FIG. 6. The user is playing an online game and utilizing the display system 1 to implement the online game. The display panel 30 is displaying an image frame F. As shown in FIG. 3 and FIG. 6, the illumination device 60 is disposed on the upper side 102 of the display device 10. The illumination device 60 projects the light in the direction D2 to illuminate the back side 106 of the display device 10. The direction D2 is relative to the back surface 110 of the display device 10. When the illumination device 60 projects light in the direction D2, the control circuit 40 generates a control signal SC2 according to display contents of a display area A2 of the image frame F. The illumination device 60 projects a second pattern F2 according to the control signal SC2 for performing a second illumination mode. For example, the control signal SC2 may be associated with the display contents of the display area A2 of the image frame F. For example, the control signal SC2 may be associated with color values of display pixels in the display area A2 of the image frame F. The control signal SC2 may be associated with brightness values of display pixels in the display area A2 of the image frame F. The second pattern F2 projected by the illumination device 60 in the second illumination mode may be associated with the display contents of the display area A2 of the image frame F. Color values of the second pattern F2 projected by the illumination device 60 in the second illumination mode may be associated with color values of display pixels in the display area A2 of the image frame F. Brightness values of the second pattern F2 projected by the illumination device 60 in the second illumination mode may be associated with brightness values of display pixels in the display area A2 of the image frame F.

As shown in FIG. 6, the current display content in the display area A2 of the image frame F displayed on the display panel 30 includes the game character's health point status (or called blood bar). The illumination device 60 is projecting the light in the direction D2. That is, the illumination device 60 is projecting the light at the back side 106 of the display device 10. Further, the control circuit 40 generates the control signal SC2 according to the display contents of the display area A2 of the image frame F, such that the illumination device 60 projects a second pattern F2 to the back side 106 of the display device 10 according to the control signal SC2 for performing the second illumination mode. The second pattern F2 may be a pattern indicating the health point status as shown in the display area A2 of the image frame F. The second pattern F2 may be regarded as atmosphere light, ambient light or an immersive projected light pattern. Therefore, during playing the online game, the user can not only see the image frame F displayed on the display panel 30, but also see the second pattern F2 projected on the back side 106 of the display device 10 by the illumination device 60 in the second illumination mode. For example, the second pattern F2 may be projected on the wall behind the display device 10. As a result, when viewing the health point status of the second pattern F2 through the peripheral vision, the user may be able to grasp the real time status more clearly when playing the intense game, thus bringing a deeper visual immersion and giving a more immersive experience to the user, and allowing the user better immerse into the game situation.

Figure 4:
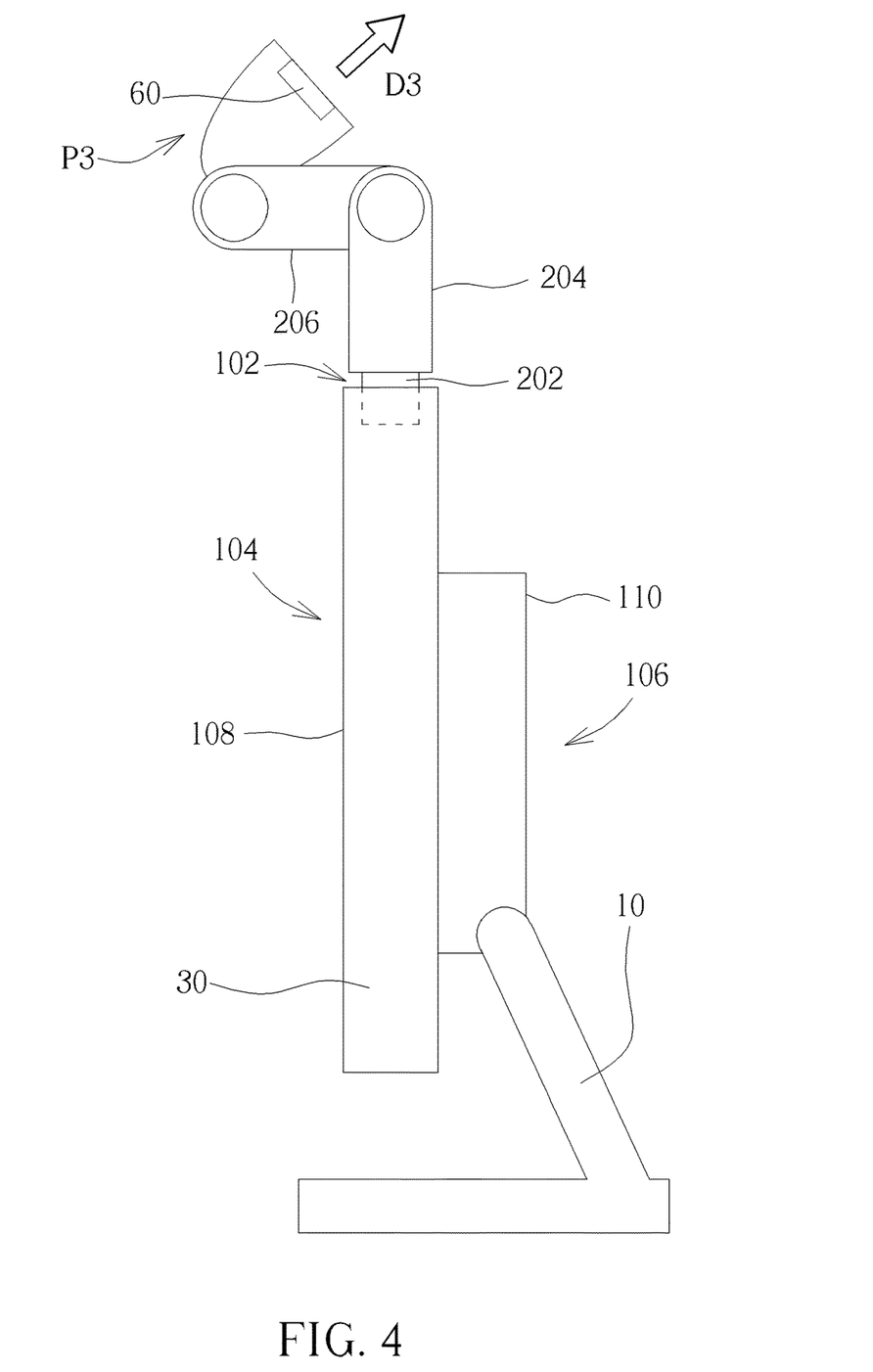
Figure 7:
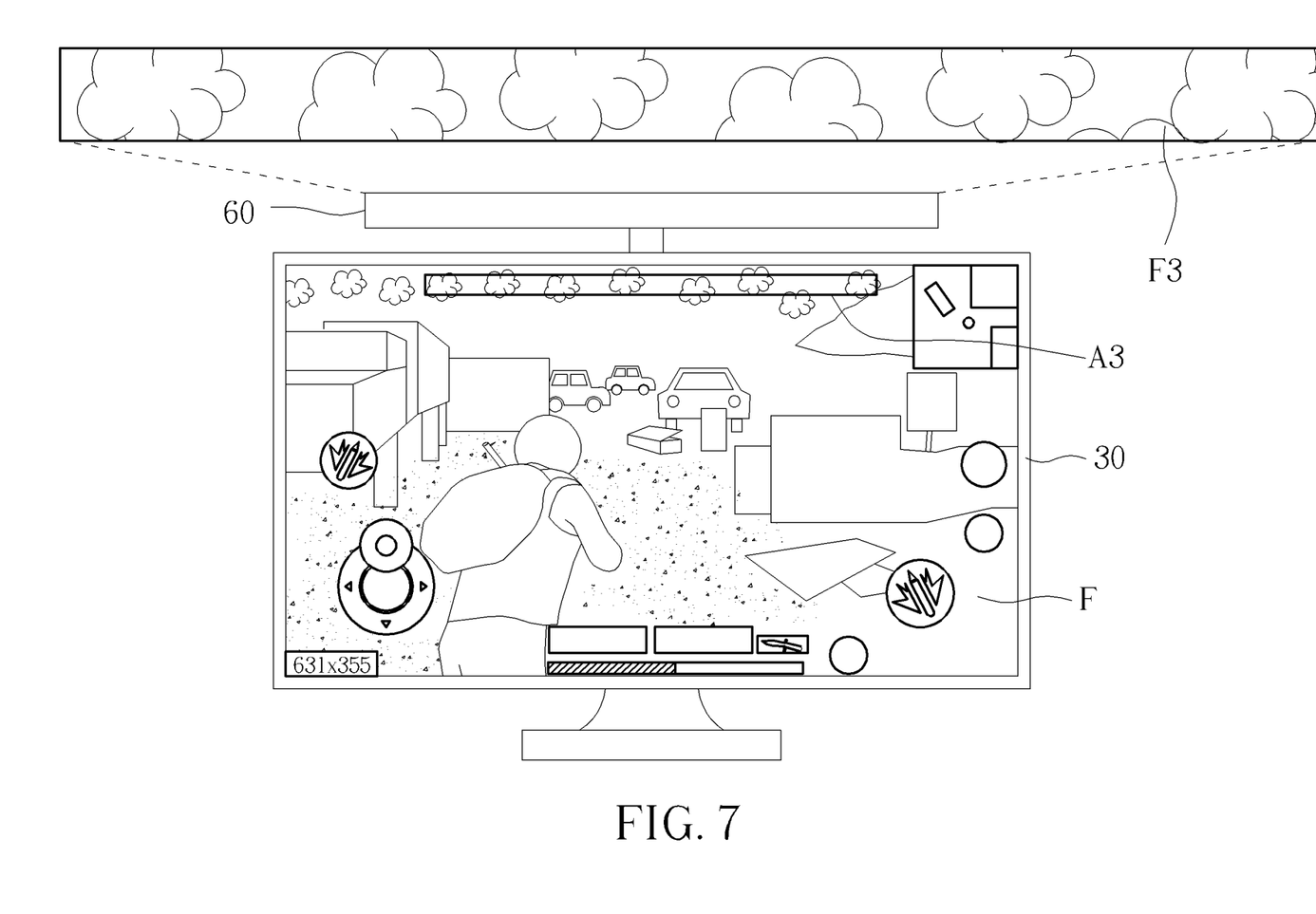

For example, please refer to FIG. 4 and FIG. 7. As the user is playing an online game and utilizing the display system 1 to implement the online game, the display panel 30 is displaying an image frame F. As shown in FIG. 4 and FIG. 7, the illumination device 60 projects the light in the direction D3 to illuminate the upper side 102 of the display device 10. When the illumination device 60 projects light in the direction D3, the control circuit 40 generates a control signal SC3 according to display contents of a display area A3 of the image frame F. The illumination device 60 projects a third pattern F3 according to the control signal SC3 for performing a third illumination mode. For example, the control signal SC3 may be associated with the display contents of the display area A3 of the image frame F. For example, the control signal SC3 may be associated with color values of display pixels in the display area A3 of the image frame F. The control signal SC3 may be associated with brightness values of display pixels in the display area A3 of the image frame F. The third pattern F3 projected by the illumination device 60 in the third illumination mode may be associated with the display contents of the display area A3 of the image frame F. Color values of the third pattern F3 projected by the illumination device 60 in the third illumination mode may be associated with color values of display pixels in the display area A3 of the image frame F. Brightness values of the third pattern F3 projected by the illumination device 60 in the third illumination mode may be associated with brightness values of display pixels in the display area A3 of the image frame F.

As shown in FIG. 7, the scene ahead of the game character is a dark blue sky with a little white cloud. The current display content in the display area A3 of the image frame F includes the blue sky and the white cloud. Since the illumination device 60 is projecting the light in the direction D3, the control circuit 40 generates the control signal SC3 according to the display contents of the display area A3 of the image frame F, such that the illumination device 60 projects a third pattern F3 according to the control signal SC3 for performing the third illumination mode. For example, the third pattern F3 is projected on the wall near the upper side 102 of the display device 10. The third pattern F3 may be (or be similar to) the blue sky and the white cloud shown in the display area A3 of the image frame F. The third pattern F3 may be an extension of the sky shown in the image frame F. The third pattern F3 may be regarded as atmosphere light, ambient light or an immersive projected light pattern. Therefore, during playing the online game, the user can not only see the image frame F displayed on the display panel 30, but also see the third pattern F3 projected on the upper side 102 of the display device 10 by the illumination device 60 in the third illumination mode, thus providing better illumination and image effect for the user, bringing a deeper visual immersion and giving a more immersive experience to the user, and allowing the user better immerse into the game situation.

In other words, the embodiments of the present invention can control the illumination device 60 to provide various illumination and image effects at different positions, so as to bring a deeper visual immersion and give a more immersive experience to the user and allow the user better immerse into the game situation when using the display system 1 (e.g., watching movies, playing online games).

Moreover, the display system 1 further includes a human machine interface (not shown in figures). For example, the human machine interface may be an on screen display (OSD) menu interface, but not limited thereto. For each illumination mode, the setting configuration of the display area of the image frame, the position and the projection direction of the illumination device 60 may be inputted through the human machine interface of the display device 10 or software executed on a host. For example, when the illumination device 60 is at a first position, the human machine interface may be configured to adjust a position of a first area. For example, as shown in FIG. 5, the position of the first area A1 may be adjusted through the human machine interface. The first illumination mode, the second illumination mode and the third illumination mode may be different from each other.

Figure 8:
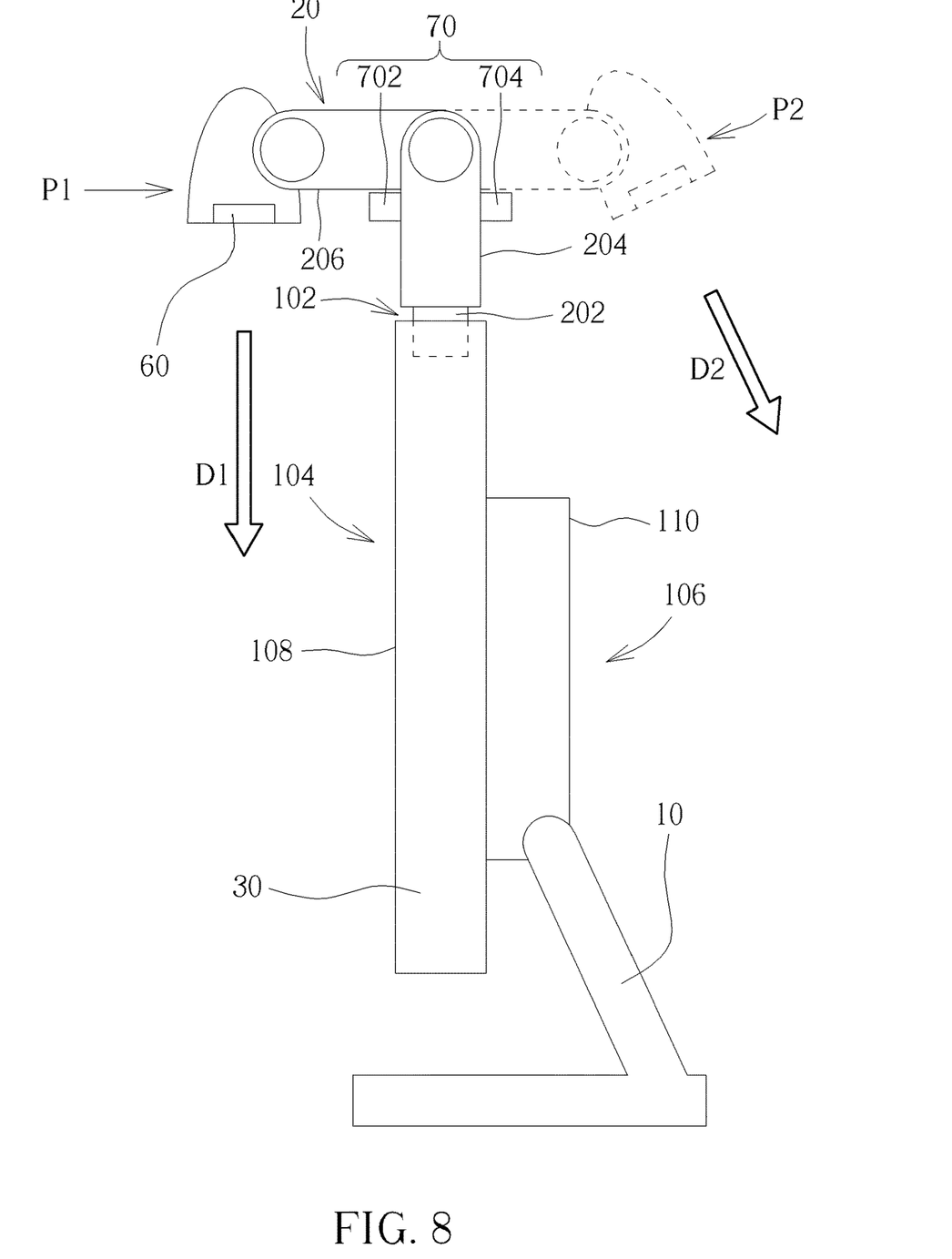
FIG. 8 is a schematic diagram of the position detector according to an embodiment of the present invention.

The illumination device 60 and the position detector 70 may be disposed on the lamp 20. The position detector 70 may be utilized for detecting the position of the illumination device 60. When the position detector 70 detects the current position of the illumination device 60 and accordingly generates a detection signal, the control circuit 40 may determine the projection direction of the illumination device 60 according to the detection signal. Moreover, the control circuit 40 may generate the control signal according to the projection direction of the illumination device 60 so as to control the illumination device 60 for performing the corresponding illumination mode. For example, the control circuit 40 may generate the control signal according to the current light projection direction of the illumination device 60 and the image frame displayed by the display panel 30, so as to control the illumination device 60 to perform the corresponding illumination modes accordingly. The position detector 70 may be a switch, a variable resistor, an angle detector, but not limited thereto. The switch may be a spring switch, a magnetic switch, or a photoelectric switch, but not limited thereto. For example, please refer to FIG. 8. FIG. 8 is a schematic diagram of the position detector 70 according to an embodiment of the present invention. As shown in FIG. 8, the position detector 70 includes switches 702 and 704. The switch 702 of the position detector 70 is disposed on one side of a bracket 204 of the lamp 20, and the switch 704 of the position detector 70 is disposed on another side of the bracket 204 of the lamp 20. The illumination device 60 is also disposed on the lamp 20. In an embodiment, when a bracket 206 of the lamp 20 touches the switch 702 of the position detector 70, the position detector 70 determines that the illumination device 60 is located at the position P1 accordingly. As the position detector 70 determines that the illumination device 60 is located at the position P1, the control circuit 40 determines that the projection direction of the illumination device 60 is the direction D1 accordingly and generates the corresponding control signal. In an alternative embodiment, when the bracket 206 of the lamp 20 is rotated to another side and touches the switch 704 of the position detector 70, the position detector 70 determines that the illumination device 60 is located at the position P2 accordingly. As the position detector 70 determines that the illumination device 60 is located at the position P2, the control circuit 40 determines that the projection direction of the illumination device 60 is the direction D2 accordingly and generates the corresponding control signal.

In an embodiment, the illumination mode may be decided by a host outside the display system 1. For example, the host may send an illumination mode command to the display system 1. The control circuit 40 may control the illumination device for performing the corresponding illumination mode according to the illumination mode command. The display system 1 may receive the illumination mode command from the host via the hub module 50 for the control operation of the control circuit 40. When the display system 1 receives the illumination mode command, the control circuit 40 may control the illumination device 60 to move or rotate to a corresponding position and the illumination device 60 may perform the corresponding illumination mode. For example, the display system 1 further includes a motor (not shown in figures). The illumination device 60 or the lamp 20 may be driven by the motor to change position. For example, as shown in FIG. 2, when the illumination mode command indicates performing the first illumination mode, the control circuit 40 controls the motor to drive the illumination device 60, such that the illumination device 60 is driven to rotate to the position P1. Further, the control circuit 40 generates the control signal SC1 to control the illumination device 60 according to the display contents of the display area A1 of the image frame F, such that the illumination device 60 projects the first pattern F1 according to the control signal SC1 for performing the first illumination mode. For example, as shown in FIG. 3, when the illumination mode command indicates performing the second illumination mode, the control circuit 40 may control the motor to drive the illumination device 60, such that the illumination device 60 may be driven to rotate to the position P2. The control circuit 40 generates the control signal SC2 to control the illumination device 60 according to the display contents of the display area A2 of the image frame F, such that the illumination device 60 projects the second pattern F2 according to the control signal SC2 for performing the second illumination mode. Such like this, the control circuit 40 may control the illumination device 60 to rotate or move to the corresponding position and the illumination device 60 may perform the corresponding illumination mode accordingly, without determining the position and projection direction of the illumination device 60 by using the position detector 70 in advance.

In an embodiment, the related control signals may be generated by an external host outside the display system. For example, as shown in FIG. 2 and FIG. 5, a host may generate and transmit a control signal SC1 to the display system 1. The control circuit 40 may utilize the control signal SC1 to control the illumination device 60 to project a first pattern F1 for performing the first illumination mode. As shown in FIG. 3 and FIG. 6, the host may generate and transmit a control signal SC2 to the display system 1. The control circuit 40 may utilize the control signal SC2 to control the illumination device 60 to project a second pattern F2 for performing the second illumination mode.

Moreover, since enough and sufficient light may prevent eye strain and fatigue, the embodiments of the present invention can provide the user for performing a normal illumination function or an auxiliary pattern projection under different illumination modes. In an embodiment, as shown in FIG. 2, when the illumination device 60 is located at the position P1 and projects the light in the direction D1, the control circuit 40 may generate the control signal SC1, such that the illumination device 60 may perform a normal illumination function for the first illumination mode according to the control signal SC1. As such, the illumination device 60 projects the light in the direction D1 for implementing the illumination function, without pattern projection. Under such a situation, the illumination device 60 illuminates the front side of the display device 10, thus enhancing the environmental illumination and improving the convenience for the user. In an alternative embodiment, as shown in FIG. 4 and FIG. 7, when the illumination device 60 is located at the position P3, and projects the light in the direction D3, the control circuit 40 may generate the control signal SC3 according to the display contents of the display area A3 of the image frame F, such that the illumination device 60 projects the third pattern F3 according to the control signal SC3 for performing another illumination mode, thus enhancing the user's visual immersion and experience.

In an alternative embodiment, the illumination device 60 can not only provide a normal illumination function, but can also project patterns associated with the information transmitted by a host, thus enhancing the user's visual immersion and experience. For example, the control circuit 40 generates a corresponding control signal according to first information transmitted by a host and the illumination device 60 projects a pattern associated with the first information according to the control signal for implementing the corresponding information mode. The first information may be, but not limited, status values (e.g., health or hit points, scores, ability points, corresponding values), logos, symbols, lighting patterns or dynamic patterns. As shown in FIG. 3 and FIG. 6, the illumination device 60 is at the position P2 and projects the light in the direction D2. The control circuit 40 receives a status value of a health point transmitted by a host. The control circuit 40 may generate the corresponding control signal according to the status value of the health point, such that the illumination device 60 may illuminate a pattern associated with the status value of the health point according to the control signal. For example, as shown in FIG. 6, the illumination device 60 may illuminate the second pattern F2 indicating the health point at the back side 106 of the display device 10.

In summary, the embodiments of the present invention can control the illumination device 60 disposed on the display device 10 to provide different illumination and image effects at different positions, thus bringing a deeper visual immersion and giving a more immersive experience to the user, making the user better immerse into the game situation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
   a display device comprising a display panel, wherein the display panel is configured to display an image frame;
   an illumination device movably disposed on the display device, wherein the illumination device selectively projects light in a first direction or in a second direction which is different from the first direction; and
   a control circuit, wherein when the illumination device projects the light in the first direction, the control circuit is configured to generate a first control signal so as to control the illumination device to perform a first illumination mode, wherein when the illumination device projects the light in the second direction, the control circuit is configured to generate a second control signal so as to control the illumination device to perform a second illumination mode which is different from the first illumination mode.

2. The display system of claim 1, further comprising:
   a position detector configured to detect whether the illumination device is at a first position or at a second position, wherein when the position detector detects that the illumination device is at the first position, the control circuit determines that the illumination device projects the light in the first direction accordingly, and when the position detector detects that the illumination device is at the second position, the control circuit determines that the illumination device projects the light in the second direction accordingly.

3. The display system of claim 2, wherein the illumination device is disposed on an upper side of the display device, the display panel is disposed on a front side of the display device, the display device further comprises a back side opposite to the front side, the illumination device projects the light in the first direction to illuminate the front side of the display device, and the illumination device projects the light in the second direction to illuminate the back side of the display device.

4. The display system of claim 3, wherein when the illumination device projects the light in the first direction, the control circuit generates the first control signal accordingly so that the illumination device performs a normal illumination function according to the first control signal for performing the first illumination mode, and when the illumination device projects the light in the second direction, the control circuit generates the second control signal according to first information transmitted by a host so that the illumination device projects a pattern associated with the first information according to the second control signal for performing the second illumination mode.

5. The display system of claim 3, wherein the illumination device and the position detector are disposed within a lamp, wherein the lamp comprises:
   a fixing component for fixing the lamp on the upper side of the display device; and
   a signal wire connected to the display device for receiving parameters associated with the image frame for driving the illumination device.

6. The display system of claim 1, further comprising:
   a hub module connected to a host outside the display system, wherein the first illumination mode and the second illumination mode are decided by the host.

7. The display system of claim 1, wherein when the illumination device projects the light in the first direction, the control circuit controls the illumination device according to a first display area of the image frame so that the illumination device projects a first pattern associated with the first display area for performing the first illumination mode, and when the illumination device projects the light in the second direction, the control circuit controls the illumination device according to a second display area of the image frame so that the illumination device projects a second pattern associated with the second display area for performing the second illumination mode.

8. The display system of claim 7, wherein color values of the first pattern projected by the illumination device in the first illumination mode are associated with color values of the first display area of the image frame displayed on the display panel, and color values of the second pattern projected by the illumination device in the second illumination mode are associated with color values of the second display area of the image frame displayed on the display panel.

9. The display system of claim 7, wherein brightness values of the first pattern projected by the illumination device in the first illumination mode are associated with brightness values of the first display area of the image frame displayed on the display panel, and brightness values of the second pattern projected by the illumination device in the second illumination mode are associated with brightness values of the second display area of the image frame displayed on the display panel.

10. The display system of claim 1, wherein when the illumination device projects the light in the first direction, the control circuit generates the first control signal accordingly so that the illumination device performs a normal illumination function according to the first control signal for performing the first illumination mode, and when the illumination device projects the light in the second direction, the control circuit generates the second control signal according to a display area of the image frame displayed on the display panel so that the illumination device projects a pattern associated with the display area of the image frame displayed on the display panel according to the second control signal for performing the second illumination mode.

11. A control method for a display device, the display device comprising a display panel for display an image frame, the control method comprising:
  disposing an illumination device on the display device;
  the illumination device selectively projecting light in a first direction or in a second direction which is different from the first direction;
  generating a first control signal to control the illumination device to perform a first illumination mode when the illumination device projects the light in the first direction; and
  generating a second control signal to control the illumination device to perform a second illumination mode when the illumination device projects the light in the second direction, wherein the second illumination mode is different from the first illumination mode.

12. The control method of claim 11, further comprising:
  detect whether the illumination device is at a first position or at a second position;
  determining that the illumination device projects the light in the first direction when detecting that the illumination device is at the first position; and
  determining that the illumination device projects the light in the second direction when detecting that the illumination device is at the second position.

13. The control method of claim 11, further comprising:
  the display device connecting to a host; and
  generating the second control signal according to first information transmitted by the host so that the illumination device projects a pattern associated with the first information according to the second control signal for performing the second illumination mode, wherein the illumination device performs a normal illumination function according to the first control signal for performing the first illumination mode.

14. The control method of claim 11, further comprising:
  generating the first control signal according to a first display area of the image frame; and
  generating the second control signal according to a second display area of the image frame, wherein the second display area is different from the first display area.

15. The control method of claim 11, further comprising:
  controlling the illumination device to project a first pattern associated with a first display area of the image frame for performing the first illumination mode according to the first display area of the image frame when the illumination device projects the light in the first direction; and
  controlling the illumination device to project a second pattern associated with a second display area of the image frame for performing the second illumination mode according to the second display area of the image frame when the illumination device projects the light in the second direction.

16. A display system, comprising:
  a display device comprising a display surface and a back surface opposite to the display surface, wherein the display surface is utilized for displaying an image frame;
  an illumination device disposed on one side of the display device, wherein the illumination device is capable of moving relative to the one side of the display device;
  a position detector configured to detect that the illumination device is selectively at a first position or at a second position; and
  a control circuit, wherein when position detector detects that the illumination device is at the first position and projects the light in the first direction, the control circuit is configured to generate a first control signal to control the illumination device for performing a first illumination mode according to a detection signal generated by the position detector, and when position detector detects that the illumination device is at the second position and projects the light in the second direction, the control circuit is configured to generate a second control signal to control the illumination device for performing a second illumination mode according to the detection signal generated by the position detector.

17. The display system of claim 16, wherein the first control signal is associated with color values and brightness values of a first display area of the image frame, the second control signal is associated with color values and brightness values of a second display area of the image frame, and the first display area and the second display area are different areas.

18. The display system of claim 17, further comprising:
  a human machine interface configured to adjust a position of the first area when the illumination device is at the first position.

19. The display system of claim 16, wherein the illumination device is rotatably disposed on an upper side of the display device, the first direction is relative to the display surface, and the second direction is relative to the back surface.

20. The display system of claim 16, wherein the illumination device, the control circuit and the position detector are disposed within a lamp, wherein the lamp comprises:

a fixing component for fixing the lamp on the upper side of the display device; and a signal wire connected to the display device for receiving parameters associated with the image frame, wherein the control circuit selectively generates the first control signal or the second control signal according the received parameters.

\* \* \* \* \*